United States Patent
Mishra et al.

(10) Patent No.: US 8,064,921 B2
(45) Date of Patent: Nov. 22, 2011

(54) METHOD AND SYSTEM FOR CLIENT-DRIVEN CHANNEL MANAGEMENT IN WIRELESS COMMUNICATION NETWORKS

(76) Inventors: Arunesh Mishra, Madison, WI (US);
Suman Banerjee, Madison, WI (US)

( * ) Notice: Subject to any disclaimer, the term of this patent is extended or adjusted under 35 U.S.C. 154(b) by 1079 days.

(21) Appl. No.: 11/737,244

(22) Filed: Apr. 19, 2007

(65) Prior Publication Data
US 2008/0259883 A1 Oct. 23, 2008

(51) Int. Cl.
*H04L 12/28* (2006.01)
*H04B 7/00* (2006.01)

(52) U.S. Cl. ................ 455/452.2; 370/329; 455/446

(58) Field of Classification Search .......... 370/3; 455/4, 455/45
See application file for complete search history.

(56) References Cited

U.S. PATENT DOCUMENTS

| | | | |
|---|---|---|---|
| 5,933,420 A * | 8/1999 | Jaszewski et al. | 370/329 |
| 6,615,040 B1 * | 9/2003 | Benveniste | 455/423 |
| 7,180,877 B1 * | 2/2007 | Benveniste | 370/329 |
| 2002/0107024 A1 * | 8/2002 | Dev Roy | 455/447 |
| 2003/0013451 A1 * | 1/2003 | Walton | 455/447 |
| 2003/0073455 A1 * | 4/2003 | Hashem et al. | 455/525 |
| 2003/0078051 A1 * | 4/2003 | Fattouch | 455/452 |
| 2005/0003827 A1 * | 1/2005 | Whelan | 455/454 |
| 2006/0109799 A1 * | 5/2006 | Tseng et al. | 370/254 |
| 2007/0004420 A1 * | 1/2007 | Reudink | 455/450 |
| 2008/0107071 A1 * | 5/2008 | Tsigler et al. | 370/329 |
| 2008/0233948 A1 * | 9/2008 | Kazmi et al. | 455/423 |
| 2008/0268861 A1 * | 10/2008 | Buracchini et al. | 455/452.1 |

* cited by examiner

*Primary Examiner* — Rafael Pérez-Gutiérrez
*Assistant Examiner* — Frank Donado
(74) *Attorney, Agent, or Firm* — Boyle Fredrickson, S.C.

(57) ABSTRACT

A method and system for assigning channels to a plurality of access points (APs) of a wireless communication network is disclosed. The method includes obtaining first information regarding first interference experienced by a first client due to multiple APs being positioned in proximity of that client, and obtaining second information regarding second interference experienced by either the first client or a first of the APs with respect to which the first client is associated, where the second interference is due either to others of the APs that are in proximity to the first AP, or to others of the clients that are in proximity to either the first client or the first AP. Additionally, the method further includes determining channel assignments for the plurality of APs based upon each of the first and second information.

10 Claims, 2 Drawing Sheets

METHOD AND SYSTEM FOR CLIENT-DRIVEN CHANNEL MANAGEMENT IN WIRELESS COMMUNICATION NETWORKS

STATEMENT REGARDING FEDERALLY SPONSORED RESEARCH OR DEVELOPMENT

This invention was made with United States Government support awarded by the following agency: NSF under Grant #CNS-0520152. The United States Federal Government has certain rights in this invention.

CROSS-REFERENCE TO RELATED APPLICATIONS

--

FIELD OF THE INVENTION

The present invention relates to wireless communications and, more particularly, to methods and systems for assigning communication channels during operation of wireless communication networks such as wireless local area networks (WLANs).

BACKGROUND OF THE INVENTION

Wireless local area networks (WLANs) have seen explosive growth in recent years as a last-hop connectivity solution. Such networks, which typically operate in accordance with IEEE 802.11-type protocols, often operate in the 2.4 and 5 GHz bands where unlicensed spectrum is very limited. Due to the growth in usage of WLANs, network administrators are faced with an emerging challenge of efficiently managing bandwidth resources to provide better service to clients.

WLANs typically are implemented through the use of one or more access point (APs) that serve as gateways for one or more clients, which can include, for example, wirelessly-equipped laptop or notebook computers. Whenever a given client is in communication with a given AP, the communication takes place by way of a given communication frequency channel. All communication between an AP and its associated clients (which form a Basic Service Set (BSS)) occur in the channel assigned to the AP.

Given that APs are communicating via respective communication channels, clients establish communication with the APs of their choice by selecting the appropriate channels associated with those APs. Often a client simply selects a channel by scanning the wireless medium for a strong signal (or the strongest signal) from an AP, and then selects that channel of the AP for its communications.

Channel assignment in conventional WLANs is determined by the APs based upon various measured information available to those APs, and/or as specified by an administrator. The manner of channel assignment used for WLANs differs from that employed in other domains, since those other manners of channel assignment typically are not applicable for WLANs. For example, channel assignment for cellular networks is traditionally modeled as a vertex coloring problem. However, the irregular coverage topologies present in WLANs due to the vagaries of the indoor radio frequency (RF) environment make such channel assignment algorithms inefficient when applied to WLANs.

Instead, as a basic design rule in assigning channels for WLANs, APs within range of one other are set to different "non-overlapping" channels. Further, multiple techniques are often employed to assign channels to APs to reduce interference between them. For example, network administrators often perform detailed Radio Frequency (RF) site surveys, often using spectrum analyzers, prior to setting up APs within a building and use this information to assign specific channels to the APs. Also, subsequent to the initial channel assignments, each AP continuously monitors its assigned channel for data transmissions by other APs and their clients. If the volume of traffic in that channel (from other APs or clients of other APs) is greater than a threshold, the first AP moves to a less congested channel, a technique that can be referred to as "Least Congested Channel Search" (LCCS).

Although conventional channel assignment techniques such as the LCCS technique do achieve workable channel assignments, such conventional channel assignment techniques often do not result in channel assignments that produce optimal bandwidth usage. The LCCS technique in particular is unable account for circumstances in which, while there is not significant interference between neighboring APs, there is nevertheless interference occurring (or potentially occurring) between APs and clients of neighboring APs, or between the clients of neighboring APs. This inability to account for the "hidden interference" occurring due to the presence of clients limits the degree to which available bandwidth can be efficiently used. Indeed, clients that are in conflict can suffer from drastic reduction in throughput. In particular, the reduction factor experienced by a given client can be non-linear in the total number of stations (clients or APs) in conflict with the given client.

In addition to being unable to account for such hidden interference, conventional channel assignment techniques such as the LCCS technique do not at all address issues of load balancing among different APs. That is, channel assignment is accomplished without any consideration of how many clients may or will be in communication with each given AP. Although in at least some circumstances, load balancing issues are considered independently of channel assignments, the lack of joint consideration of load balancing issues in conjunction with channel assignment issues also limits the degree to which available bandwidth can be efficiently used.

For at least the above reasons, therefore, it would be advantageous if an improved method and/or system for assigning channels to APs in WLANs could be developed. More particularly, it would be advantageous if, in at least some embodiments, such an improved method and/or system enabled the assignment of channels to APs so that enhanced bandwidth usage (and enhancements in overall throughput) could be achieved by the WLANs. Further, in at least some embodiments, it would be advantageous if such an improved method and/or system was able to account for interference (e.g., "hidden interference") that cannot be taken into account by conventional channel assignment techniques, and/or was able to address load balancing issues in conjunction with the process of assigning channels to APs.

BRIEF SUMMARY OF THE INVENTION

The present inventors have recognized the deficiencies of conventional techniques for assigning channels to APs in WLANS, and further recognized that at least some of these deficiencies are largely or entirely the result of the fact that conventional channel assignment techniques are "AP-centric" techniques that, while taking into account certain information associated with the APs of WLANs, fail to account for one or more types of information relating to the operation of the clients of APs. The present inventors further have recognized that, in at least some embodiments, the use of an improved channel assignment technique in which client-detected interference is reported to AP(s) and considered during the assignment of channels can result in WLANs achieving enhanced bandwidth usage and overall throughput relative to conventional embodiments. In at least some further embodiments, not only interference minimization but also load balancing (or other fairness considerations) is taken into account in assigning channels to APs.

More particularly, in at least some embodiments, the present invention relates to a method of assigning channels to a plurality of access points (APs) of a wireless local area network (WLAN). The method includes (a) identifying both a respective range set and a respective interference set for each of a plurality of clients of the WLAN, (b) determining an order of the plurality of APs, (c) calculating a respective interference level that would be experienced by one of the ordered APs assuming the one ordered AP was assigned a respective channel, (d) storing the respective interference level if the respective interference level meets a criterion, and (e) repeating (c)-(d) assuming that the one ordered AP was assigned at least one additional respective channel. Additionally, the method includes (f) repeating (c)-(e) for each of the other ordered APs, and (g) repeating (b)-(f) until a criterion has been met that at least in part concerns the interference levels experienced by at least some of the plurality of APs.

Further, in at least some embodiments, the present invention relates to a method of assigning channels to a plurality of access points (APs) of a wireless communication network. The method includes obtaining first information regarding first interference experienced by a first client due to multiple APs being positioned in proximity of that client, and obtaining second information regarding second interference experienced by either the first client or a first of the APs with respect to which the first client is associated, where the second interference is due either to others of the APs that are in proximity to the first AP, or to others of the clients that are in proximity to either the first client or the first AP. Additionally, the method includes determining channel assignments for the plurality of APs based upon each of the first and second information.

Also, in at least some embodiments, the present invention relates to an access point (AP) system that includes a transceiver by which the AP system is capable of communicating with at least one client by way of a channel, a port by which the AP system is capable of being in communication with at least one additional AP system of a WLAN of which the AP system forms a part, a memory device, and a processing device coupled at least indirectly to each of the transceiver, the port, and the memory device. The AP system receives by way of the transceiver at least one signal from the at least one client indicative of either interference being experienced by the at least one client or one or more of the at least one additional AP system with which the at least one client can potentially be in communication. Further, the processing device either by itself or in cooperation with at least one other processing device of one or more of the at least one additional AP system, and based upon the at least one signal, determines the channel by which the transceiver is capable of communicating.

DETAILED DESCRIPTION OF THE PREFERRED EMBODIMENT

Figure 1:
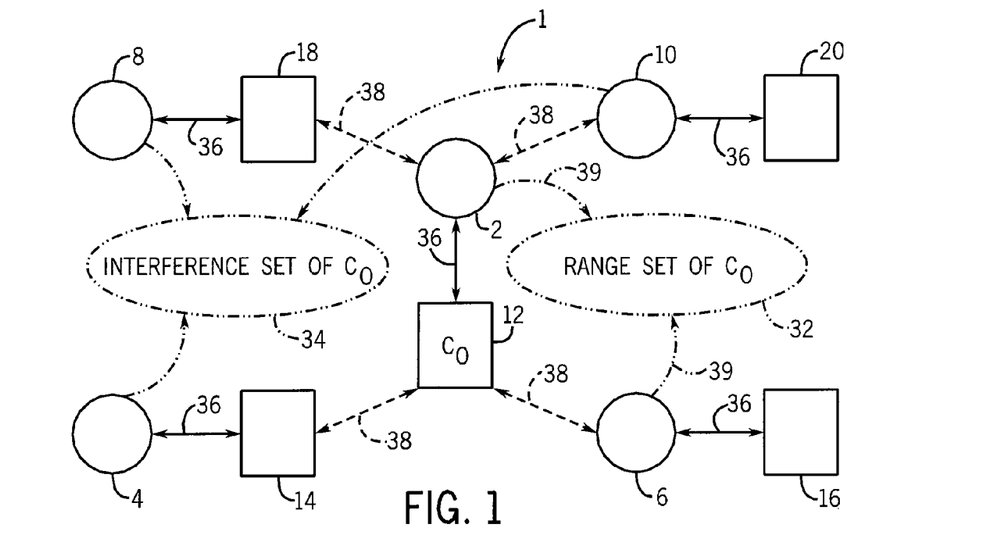
FIG. 1 is a schematic diagram of an exemplary WLAN including multiple APs and clients, as well as indicating exemplary range and interference sets for that WLAN.

Referring to FIG. 1, an exemplary wireless local area network (WLAN) 1 is shown to include first, second, third, fourth and fifth access points (APs) 2, 4, 6, 8 and 10, respectively, each of which is represented by a circle. Additionally, the WLAN 1 includes first, second, third, fourth and fifth clients 12, 14, 16, 18 and 20, respectively, each of which is represented by a square. Although FIG. 1 shows the WLAN 2 to include both five APs and five clients, the present invention is intended to encompass a variety of other WLAN arrangements having any arbitrary number of APs or clients, albeit it will be understood from the discussion below that the present invention becomes increasingly valuable as the number of APs and/or clients increases, since with increasing numbers of these devices, the potential for conflict among these devices in their communications also increases. Typically, although not necessarily, the WLANs will have two APs at a minimum.

The WLAN 1 in the present embodiment operates in accordance with an IEEE 802.11-type protocol (e.g., a Wi-Fi protocol such as the 802.11(b) protocol), in either the 2.4 or 5 GHz bands. However, the present invention is intended to encompass other embodiments in which the WLAN operates in accordance with other standards, protocols or rules, or within different frequency bands or ranges. Indeed, the present invention is intended to encompass a variety of other embodiments employing other types of wireless communication networks other than WLANs.

With respect particularly to the APs 2, 4, 6, 8 and 10, these are systems that can take a variety of forms depending upon the embodiment and should be generally understood as being any of a variety of systems or devices capable of receiving and transmitting wireless communication signals within a local area or region. In at least some embodiments, for example, each of the APs can be a WAP-4000 AP available from the Planet Technology Corporation of Taipei, Taiwan.

As for the clients 12, 14, 16, 18 and 20, these can be any of a variety of systems/devices that are configured for receiving and transmitting wireless communication signals with respect to one or more APs. For example, the clients 12, 14, 16, 18 and 20 each can be different wirelessly-equipped laptop or notebook computers. While the APs 2, 4, 6, 8 and 10 typically are stationary (e.g., with respect to some reference point such as a location in a building, a ship or the earth) and the clients 12, 14, 16, 18 and 20 typically are mobile devices (at least relative to one or more of the APs), the APs can also be mobile, and/or the clients can be stationary or fixed in their position relative to the APs or relative to some other reference point.

Figure 2:
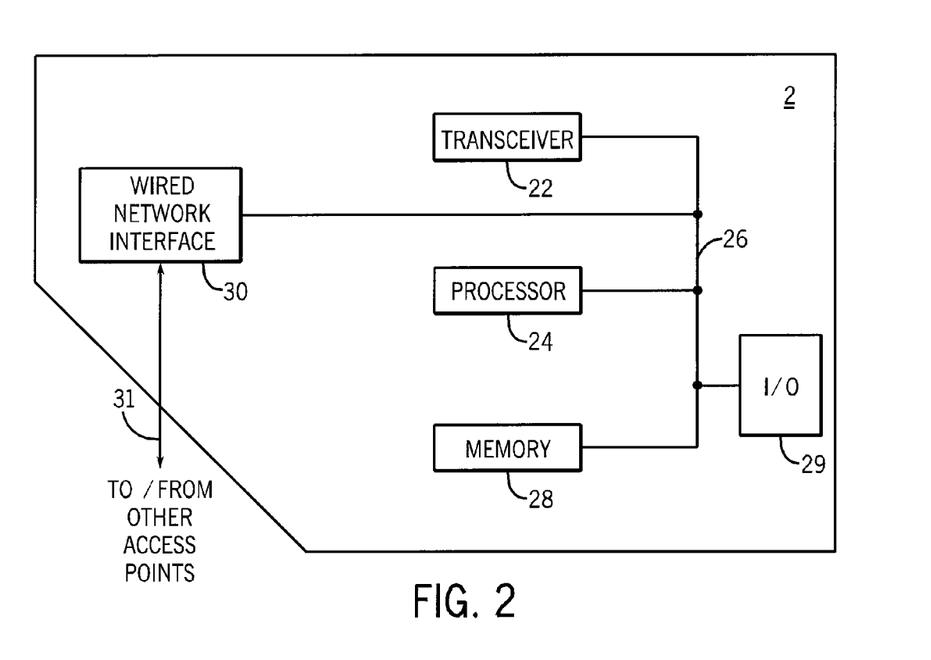
FIG. 2 is a block diagram illustrating exemplary components of an AP.

Referring additionally to FIG. 2, a block diagram is provided showing exemplary components of one of the APs, in this case the first AP 2. As shown, the AP 2 includes a transceiver 22 that includes one or more antennas (not shown) and is coupled by way of an internal network or bus 26 to a processor 24. The processor 24 also is coupled by way of the bus 26 (or other link(s)) to several other components including, for example, a memory 28, one or more input/output (I/O) devices 29, as well as a wired network interface 30. The processor 24 can take a variety of forms, for example, that of a microprocessor, a programmable logic device (PLD) or other control device, and communicates with each of the transceiver 22, memory 28, I/O devices 29 and wired network interface 30 by way of the bus 26 (or multiple such communication links). By way of these communications, the processor 24 controls and/or monitors and/or otherwise interacts with each of these other components.

More particularly, the transceiver 22 is capable of receiving wireless communication signals (e.g., RF signals or microwave signals in accordance with IEEE 802.11-type protocols or otherwise) and sending communications representative of these received signals to the processor 24. Likewise, the processor 24 is capable of sending signals to the transceiver 22 that are then transmitted by the transceiver as wireless communication signals. As for the memory 28, it is capable of storing various software including, for example, operating system software, firmware or applications software capable of operating on the processor 24, as well as various data that is of use to the processor 24 of the AP 2. The memory 28 can include one or more memory devices and take various forms including, for example, random access memory (RAM) such as dynamic RAM or static RAM, or read only memory (ROM).

With respect to the I/O devices 29, these can include a variety of input and/or output devices including, for example, visual input and/or output devices (e.g., a video monitor or touch screen), audio input and/or output devices (e.g., a speaker or microphone), or mechanical input and/or output devices (e.g., pushbuttons or vibrating devices). Also, in at least some embodiments, the AP 2 will not have any such I/O devices, to the extent that interfacing by operator(s) with the AP is handled indirectly by way of other terminals or devices.

Finally, with respect to the wired network interface 30, this interface allows for the AP 2 to be in communication with the other AP(s) of the WLAN 1, e.g., with the APs 4, 6, 8 and 10 of FIG. 1 by way of a wired (e.g., as opposed to wireless) network 31. By virtue of communication between the processor 24 of the AP 2 and the other APs 4, 6, 8 and 10 by way of the wired network interface 30 and wired network 31, the APs are able to coordinate their behavior to achieve optimal or otherwise appropriate behavior for the WLAN 1. In the present embodiment, this coordination of the APs 2, 4, 6, 8 and 10 in particular results in appropriate assignments of wireless communication channels to the respective APs according to processes/algorithms such as the exemplary processes/algorithms described below.

More particularly, the APs 2, 4, 6, 8 and 10 collect information from clients (e.g., set-tuples including range and interference sets of the clients as discussed further below) and, based upon that information, a central entity (e.g., one of the APs or an additional server or other computer system connected to the different APs) provided with this information then executes a channel assignment process/algorithm such as that described below to determine the appropriate channel assignments. The assignment information is then communicated to the different APs so that the APs can conform their behavior appropriately. Additionally, as also discussed below, in at least some embodiments of the invention the channel assignment process/algorithm also performs load balancing and, in doing so, determines how the clients 12, 14, 16, 18 and 20 are assigned to the APs 2, 4, 6, 8 and 10. Such assignment information is then communicated both to the APs 2, 4, 6, 8 and 10 and the clients 12, 14, 16, 18 and 20 so that those devices can conform their behavior appropriately.

In the present embodiment, the assignment of channels to the APs 2, 4, 6, 8 and 10 of the WLAN 1 is determined based not only upon the circumstances of the APs, but also upon the circumstances of the clients 12, 14, 16, 18 and 20. Channel assignments in particular are set in order to minimize or even eliminate interference (including "hidden interference" as described above) that could occur between the APs 2, 4, 6, 8 and 10 and clients 12, 14, 16, 18 and 20 of the WLAN 1. As discussed further below, in at least some additional embodiments, the channel assignments also are set in order to balance the loading of the different APs 2, 4, 6, 8 and 10 relative to one another in terms of the number of clients that are in communication with those respective APs (e.g., to balance the amount of communications with clients occurring with respect to the different APs).

With respect to interference minimization in particular, a given AP-client communication link can suffer conflicts or interference with other AP-client links at one or both of the AP end/side and the client end/side. A client can be said to be "conflict-free" if its association with an AP on an assigned channel eliminates conflicts both at that AP and at the client itself. Ideally, the channel assignment of an AP is set, and a client is associated with an AP, in order to achieve such a conflict-free status for the client (e.g., so that the client has exactly one AP from which it obtains service). If for a given client there does not exist an AP (and appropriate communication channel assignment) that allows for such conflict-free status, then desirably the client associates to an AP such that the AP-client link has "minimum conflict", where conflict on a particular channel can be measured as the number of APs that share the channel. Thus, at least one goal of channel management is to assign channels to APs in such a way that it minimizes the conflict for each client, that is, to produce an association mapping of clients to APs, where each client associates with an AP that has the minimum conflict.

In accordance with at least some embodiments of the present invention, to determine channel assignments and client-AP pairs that minimize interference or conflict for the WLAN 1, two measures of conflict are used in relation to each client 12, 14, 16, 18 and 20. More particularly, each of the clients 12, 14, 16, 18 and 20 is represented as a tuple of two sets <r, i>, namely, a range set r and an interference set i. The range set r with respect to each client is defined as the set of all APs within whose communication ranges lie the respective client, regardless of the current channel(s) of operation of the APs. Thus, the range set r of a given client includes not only the AP with which the client is associated (e.g., is communicating), but also other APs that potentially can communicate directly with that client since the client is within the ranges of those APs.

Although the range set r of a client captures some of the interference experienced by the client, it does not capture the total interference potentially affecting that client. Rather, a given client can suffer additional interference (beyond that resulting from the APs of the range set) if the given client is within the ranges of other clients of other APs, or if the AP with which the given client is associated is also within the ranges of other APs or other clients of other APs. The interference set i is intended to encompass such other interference. More particularly, an AP "A" is a member of the interference set of a client "C" if (i) A is not a member of the range set of C and, (ii) A is either within the communication range of the AP of the client C, or is within the communication range of a client that in turn is within either the range of the client C or the range of the AP of the client C. That is, the AP A is a member of the interference set of the client C if it is within one-hop range of the link between the client C and its associated AP.

It should be noted that each of the range set r and the interference set i of a client only expressly includes APs, and not other clients. To the extent that additional interference can be experienced by either a given client or its associated AP due to the operation of another client of another AP, the interference set for the given client takes into account this additional interference insofar as the interference set in such circumstance then includes the other AP associated with that other client. That is, the interference set of a client of interest indirectly takes into account interference affecting that client's communication with its associated AP that results from other clients of other APs, insofar as the interference set then includes those other APs.

Referring still to FIG. 1, an exemplary range set 32 and an exemplary interference set 34 for the client 12 (for convenience, also labeled as $C_O$) when included within the WLAN 1 are shown. For the purposes of this example, devices that are within "range" of one another (e.g., capable of communicating with one another, and/or interfering or conflicting with one another) are connected by arrows. More particularly, solid arrows 36 indicate an association of a client with an AP. Thus, the client 12 is associated with the AP 2, the client 14 is associated with the AP 4, the client 16 is associated with the AP 6, the client 18 is associated with the AP 8, and the client 20 is associated with the AP 10. Additionally, dashed arrows 38 indicate that the devices connected by way of the arrows are capable of interfering/conflicting with one another. Thus, the AP 2 potentially conflicts with each of the client 18 and the AP 10, and the client 12 potentially conflicts with the client 14 and the AP 6. Although in the present embodiment, clients and APs are associated with one another on a one-to-one basis, it will be understood that in other embodiments multiple clients can be assigned to a single AP and/or one or more of the APs need not have any clients assigned to them.

In view of the above definitions of the range and interference sets for a client, it is clear that, as shown by FIG. 1, the range set 32 for the client 12 includes both the AP 2, with which the client is associated, as well as the AP 6, as indicated by dotted arrows 39. The fact that the AP 6 is within the range set 32 is indicative of the fact that the AP 6 potentially interferes/conflicts with the communications between the client 12 and the AP 2, that is, interferes/conflicts with the client-AP link represented by the arrow 36 connecting the client 12 and the AP 2.

As for the interference set 34 of the client 12, that set includes three APs, namely, the APs 4, 8 and 10. The AP 4 is included within the interference set 34 because the client 14 associated with that AP is capable of interfering with the first client 12, as indicated by one of the dashed arrows 38 between those clients. The AP 8 is included within the interference set 34 because the client 18 associated with that AP is capable of interfering with the AP 2 that is associated with the client 12, and thus is also capable of interfering with the client-AP link between the client 12 and the AP 2 represented by the arrow 36 therebetween. Further, the AP 10 is included within the interference set 34 because, as represented by one of the dashed arrows 38, the AP 10 is capable of interfering with the AP 2 that is associated with the client 12, such that the AP 10 is capable of interfering with the client-AP link between the client 12 and the AP 2.

Based upon the range sets and interference sets, a set of sets can also be determined for the WLAN 1 that can in turn be used to perform optimized assignment of channels (e.g., by the AP, server, or other control device that is coordinating the entire WLAN). Such a set of sets is a collection of sets, where each set is a tuple representing a client, that represents a collective view of the interference experienced by all clients globally for the WLAN 1. The set of all sets can be understood mathematically as follows. Let (X, C) denote a wireless network, where X is the set of all APs and C is the set of all clients. For each client c in C, one associates a tuple $t_c = <r_c, i_c>$ where $r_c$ in $2^X$ ($2^X$ denotes the power set of X) is the range set for c and $i_c$ in $2^X$ is the interference set for c. Given these assumptions, then $T = \{t_c = <r_c, i_c> |$ for all clients $c\}$ is the set of all sets. One further can refer to (X, T), when defined in the above manner, as a conflict set system (or simply, a set system) for the network (X, C).

Once the range sets, interference sets, and set of all sets have been determined, then a process can be performed to arrive at channel assignments that result in minimized interference. This process can generally be conceptualized as a color assignment process as follows. Suppose that $\Theta(X) \rightarrow \{1 \ldots k\}$ is a channel (or "color") assignment using k colors, for a set system (X, T). Then, for a client represented by $t_c = <r_c, i_c>$ in T, if one further defines $z_j = \{x$ in $r_c \cup i_c : \Theta(X) = j\}$, then there exists j in $\{1 \ldots k\}$, such that (i)$|z_j| = 1$ and (ii) if one lets $z_j = \{x_j\}$, then $x_j$ is in $r_c$. In other words, the assignment of colors ($\Theta$) to the APs is performed in such a way that for the client (c) there is at least one AP (a) in the range set of c which is assigned a color, j, and no other AP in the range set or interference set of c has been assigned to this same color, j. This property can be referred to as the conflict-free coloring property, and it can further be said that the client c is conflict-free.

A solution to conflict set coloring also implicitly defines an association mapping for the client. That is, the client will associate to the AP which holds the conflict-free color in its range set. Thus, the solution provides the following: (1) $\Theta$ gives the channel assignment for the APs; and (2) for $t_c$ in T, a particular $\gamma(c) = x$ is defined such that the color of x is conflict-free in $t_c$ (x is the AP that leads to conflict-freedom for this client). For clients that are not conflict-free, x is the AP that suffers from minimum conflict out of all APs in the range set of c. Further, $\gamma(c)$ provides the association mapping for all clients.

Figure 3:
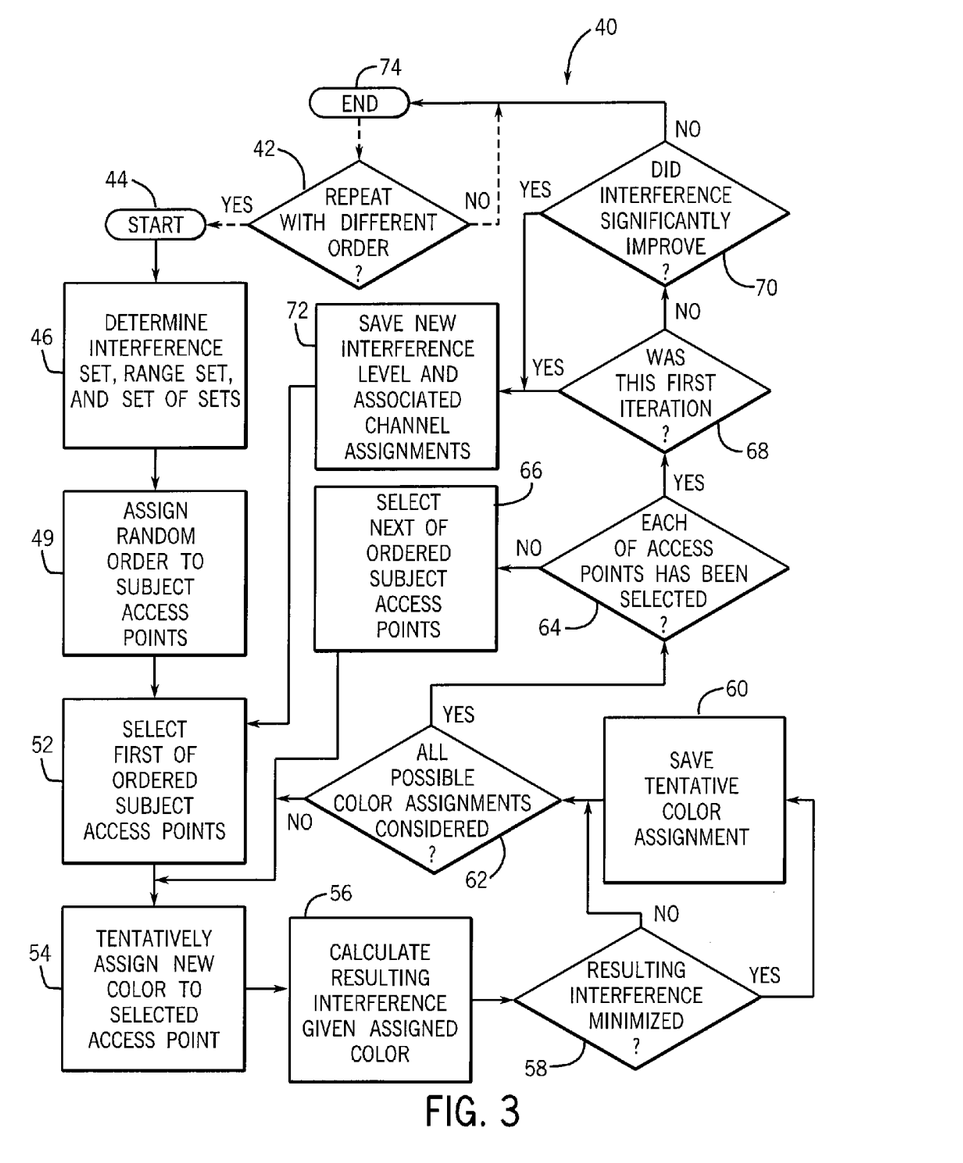
FIG. 3 is a flow chart illustrating exemplary steps of operation of the WLAN of FIG. 1 (or one or more components thereof, or one or more devices controlling the WLAN or portions thereof) allowing for the assignment of channels to the APs of the WLAN.

In at least some embodiments, in order to efficiently maximize the number of conflict-free clients in the set system, a process such as that shown in FIG. 3 can be performed. Conceptually the process progressively chooses the "best" channel (color) for an AP that maximizes the number of clients that are conflict-free. Table 1 further shows an exemplary pseudocode implementation of such a process. The process of FIG. 3/Table 1 involves a randomized algorithm for conflict set coloring with a conflict-freedom function as the objective function (the algorithm being discussed further below). The algorithm, which can be termed "randomized compaction," works in a centralized manner and is particularly suited for centrally-managed wireless networks with multiple APs, as is typical in most organizations, airports, hotels, etc. By using the ability to detect and capture different types of conflicts, and by taking advantage of the conflict set coloring formulation which captures opportunities for channel re-use, this centralized algorithm performs better than conventional approaches such as least congested channel search (LCCS) or other AP-centric approaches.

Turning then to FIG. 3, assuming that the range sets, interference sets and set of sets of a WLAN such as the WLAN 1 can each be understood as described above, a process 40 shown in exemplary form can be performed to determine optimal channel assignments for the various APs of the WLAN. The process 40 is performed as follows. First, after starting the process 40 at a step 44, at a step 46 the range sets and interference sets for each of the clients of the WLAN are determined (FIG. 1 only shows such sets being determined for one of the clients, namely, the client 12). Based upon the range sets and interference sets, the set of all sets T is also determined at the step 46, such that the entire conflict set system (X,T) is determined. Subsequently, at a step 49, all of the subject APs are randomly assigned an order. Lines 1-2 of the pseudocode of Table 1 serve to perform this step, while line 3 of the pseudocode sets initial values for the channel assignments (which can be considered to be part of step 49 as well).

At this point, an iterative algorithm begins that encompasses additional steps 52, 54, 56, 58, 60, 62, 64, 66, 68, 70 and 72. The algorithm generally corresponds to lines 4-12 of Table 1, where line 4 in particular sets up a loop that allows subsequent, inner steps (which form the core algorithm) to execute until further iterations no longer result in significant changes or improvements in the overall interference level of the WLAN 1 as represented by the Num_Conflict_Free function shown in line 5. More particularly, at the step 52, a first of the subject APs ordered in the step 49 is selected and, at the step 54, a new channel (color) is tentatively assigned to that AP. Further, at the step 56, the interference resulting from such a channel (color) assignment is calculated. Further, at the step 58, a determination is made as to whether the interference resulting from the present, tentative channel (color) assignment is at a minimum level relative to previously-assumed channel assignments.

If at the step 58 it is determined that a new minimum level of interference has been attained using the present, tentative channel assignment, then that channel assignment is saved/stored at the step 60. Upon the completion of the step 60, or if it is determined at the step 58 that a new minimum level interference has not been attained using the present channel assignment, then the process 40 proceeds to the step 62, at which it is determined whether all possible color assignments have been considered. If it is determined that not all possible channel (color) assignments have been considered, then the process 40 returns to the step 54, at which another new channel (color) is tentatively assigned to that AP and steps 56 and 58 are subsequently repeated. However, if at the step 62 it is determined that all possible channel (color) assignments have been considered for the selected AP, then the process 40 proceeds to the step 64.

The calculations/determinations made in the steps 56 and 58 (as well as the related steps 54, 60 and 62 of FIG. 3) can be understood as corresponding to line 7 of the pseudocode of Table 1, and can be referred to as a "compaction" step. In the present embodiment, the compaction step is the core optimization that the algorithm performs, and in particular is performed to optimize the Num_Conflict_Free function, which represents the performance of the WLAN 1 in terms of overall interference level. For example, consider an AP ap in X. If one keeps all of the other channel/color assignments the same, the compaction step assigns a color to ap that maximizes the number of conflict-free clients overall for the set system (X, T). Such a channel/color is then chosen as the new assignment for ap. It should be further noted that the number of conflict-free clients can be computed using the interference set information.

Still referring to FIG. 3, at the step 64, it is determined whether each of the subject APs has been selected and considered, that is, whether compaction has been performed in relation to each of the APs. If not, then the next AP in the sequence of ordered APs is selected at the step 66 and the process then returns to the step 54 at which a channel (color) is assigned to that AP. If, however, at the step 64 it is determined that each of the subject APs has been selected, then the process proceeds to a step 68. The determination made at the step 64 and related performance of the step 66 can be understood to correspond to lines 6 and 8 of Table 1. Once the process advances to the step 68, compaction has been performed in relation to each of the subject APs, such that the interference associated with the assignment of each possible channel to each AP of the ordered set of APs has been evaluated, and such that a particular set of channel assignments tending to result in minimized interference has been determined and stored (e.g., by repeated performance of step 60).

Although it is true that, upon proceeding to the step 68, compaction has been performed in relation to each of the subject APs, it is not necessarily the case that the resulting set of stored channel (color) assignments is the set of channel assignments that would minimize interference for the WLAN. Rather, the set of channel assignments that results in best performance (in this case, minimized interference) typically will vary somewhat if the algorithm is performed again over and over again using the same ordering of the APs (e.g., as was determined originally in the step 49), due to the interdependencies between the channel assignments to APs. Therefore, to obtain a set of channel assignments that will minimize interference, it is necessary to repeat the steps 54-66 repeatedly using the same orderings of the APs. Eventually, by performing multiple iterations for the same AP ordering, the algorithm converges an assignment of channels and the repetitive performing of the algorithm can be stopped when the amount of improvement resulting from reperforming the algorithm becomes minimal or meets some threshold. This iterative process corresponds to lines 9-11 of Table 1.

Thus, at the step 68, it is determined whether the channel assignment results obtained thus far are the result of the first iteration of the steps 52-66. If this is the case, then these channel assignments and the associated overall interference level are stored at a step 72. Subsequently, the steps 52-66 are repeated for this new ordering of the subject APs, after which the process 40 again returns to the step 68. However, if at the step 68, it is determined that the channel assignment results obtained thus far are the result of a second or later iteration of the steps 52-66, then the process at the step 70 determines whether the results from this later iteration are significantly improved relative to the results stored previously (e.g., during prior performance of the step 72). If so, then the step 72 is again performed, at which time these latest, improved results are stored, and further the step 72 is followed again by the steps 52-70. If, however, it is determined at the step 70 that this latest iteration of the steps 52-66 has not improved the interference levels significantly, then the process 40 ends a step 74, and the results stored during the most recent performance of the step 72 constitute the final channel assignment.

Whether a given interference level generated by the performance of the steps 52-66 is improved to a sufficiently significant degree so as to justify saving the channel assignments producing that interference level (e.g., by proceeding from the step 70 to the step 72) can be determined by a variety of measures. In at least some embodiments, a simple determination is made as to whether the improvement in the overall interference level resulting from the latest iteration exceeds a threshold, in which case the latest channel assignments are stored, or does not exceed that threshold, in which case the previous set of channel assignments are maintained. For example, by way of lines 6-8 of the pseudocode, the value of the objective function Num_Conflict_Free representing the number of conflict-free clients is determined. The channel assignment for an AP is changed (e.g., at the step 72) only if it improves this objective function value. However, if the pseudocode the objective function value stays the same after applying the compaction step, the algorithm/process terminates (e.g., at the line 10 of Table 1).

Although the above-described embodiment envisions determining a final channel assignment order that optimizes performance (interference) based upon a single assumed order of the subject APs as is generated in the step 49, in alternate embodiments the algorithm can be reperformed after modifying the assumed order of the subject APs. More particularly, as illustrated by a step 42 linking (by way of dashed lines) the end step 74 with the start step 44 in FIG. 3, in such alternate embodiments a further determination is met as to whether the algorithm of the steps 54-72 should be repeated for a different assumed order of APs. Depending upon whether the step 42 is performed, and depending upon what determination is made at that step, the process 40 (and particularly the steps 54-72) can be repeated any number of times. Cessation of this process can be determined again based upon whether the overall performance (interference) has improved significantly or not, or upon some other criteria (for example, whether all possible permutations of APs have been tested).

In summary, the above-described process 40 operates by repeatedly invoking the compaction step for each AP in succession. The order of invocation is randomized by using a random permutation of the APs. The entire compaction process (lines 6-8 of the pseudocode) is repeated until an objective function (e.g., the number of conflict-free clients) stops improving. In at least some embodiments, such as that exemplified by the pseudocode of Table 1, the objective function is a discrete value, and is lower bounded (by zero). Thus, after even only two executions of the compaction process (or in alternate embodiments, even one execution of that process), the algorithm either improves the objective function or terminates (e.g., at line 10 of the pseudocode). Thus, the algorithm will provably terminate. Further, by invoking the compaction algorithm multiple times with different random permutations, it is often if not always possible to obtain the best solution across these runs. That is, by invoking this algorithm multiple times, it is possible to perform a randomized search with iterative refinement over the solution space. This increases the chances of converging to a better optima and possibly the global optimum over multiple executions.

TABLE 1

X = set of access points
T = set of (range,interference) tuples for each client
k = number of colors
θ: X → {1 ... k} is the returned channel assignment
1:  X' be a random permutation of X.
2:  Let X' = {$x_1, x_2, ..., x_i$}.
3:  Set for all x in X,θ(x) = −1 /* indicates an unassigned AP */
4:  while true do
5:    ncf ← Num__Conflict__Free(T,θ)
6:    for i = 1 ... |X| do
7:       θ($x_i$) ← Compaction__Step ($x_i$,θ,T,k)
8:    end for
9:    if Num__Conflict__Free (T,θ) = ncf then
10:       stop
11:    end if
12:  end while As should be evident from the above description, the process 40 of FIG. 3 (or algorithm exemplified by the pseudocode of Table 1) requires an accurately-constructed conflict graph or conflict set system (X, T). Such a conflict graph/set system can be developed in various ways for a given WLAN such as the WLAN 1 of FIG. 1. For example, in at least some embodiments, the APs can find out the range and interference sets of their clients by requesting that each of the clients conduct a respective site-report as specified in IEEE 802.11K drafts (which concern radio resource management).

In generating such a site-report, a client scans all channels and reports all of the APs within its range on the different channels. The scan can be, for example, a standard operation supported by all wireless cards that follow the IEEE 802.11b protocol. The scan provides a list of APs and other clients within range, and this information can be used to compute the range and interference sets for clients. Such scans can be requested periodically or dynamically based on mobility. Further for example, a scan for IEEE 802.11b can be completed in around 150 ms, which is negligible compared to duration of a channel assignment or reassignment.

Typically, in a given WLAN, channel assignments do not remain constant indefinitely but rather channels are reassigned repeatedly, either periodically or dynamically based on feedback. A WLAN in which channels are reassigned dynamically based upon feedback in particular triggers a reassignment if the quality of the current assignment as measured by the objective function degrades below a relative threshold. Changing the channel for an AP/client is a relatively low-cost operation (1-2 ms) which can be implemented mostly as a driver update (e.g., as software updates to the software operating on existing APs/clients) rather than requiring significant hardware updates. The actual operation of changing the channel can be synchronized with an AP's periodic broadcasting signal or "beacon". The IEEE 802.11K draft specifies MAC level primitives to achieve this goal, where MAC-level primitives are 802.11 protocol extensions specified in the 802.11k draft version to allow for measurements and changes to the current channel of operation (thus allowing for dynamic channel adjustment).

The above-described approach to modeling the interference among APs and clients in a WLAN such as the WLAN 1 can be described as a client-driven approach, insofar as it takes into account all (or substantially all) of the interference experienced by the clients of the WLAN. The above-described approach is particularly effective insofar as it takes into account both the interference associated with range sets and the interference associated with interference sets, as experienced by the clients of the WLAN. As a result, it is possible to determine improved channel assignments for the APs of the WLAN that truly minimize or eliminate interference (including "hidden interference" as described above) rather than only a portion of the interference.

Additionally, this approach intrinsically captures opportunities for channel re-use. In particular, by keeping the model for a given WLAN updated on a periodic yet coarse-grained basis, it is possible to neglect fine-grained user migrations, and to capture medium and large-scale variations of client distributions (where a "coarse-grained" time scale can be understood as a time scale on the order of tens of minutes or an hour and, in contrast, a "fine-grained" time scale can be understood a time scale on the order of seconds or less). Further, algorithms that provide channel assignment using this approach (for example, the exemplary algorithm described above with respect to FIG. 3 and Table 1) are particularly efficient, irrespective of the underlying physical RF properties of the wireless environment of the WLAN. This advantage is possible because the interference constraints are sampled directly at the clients rather than inferred using properties of radio propagation. Thus, such an approach is applicable to indoor environments which are challenging to model from an RF perspective.

In at least some embodiments of the present invention, such as that described above with reference to FIG. 3, the sole (or primary) objective is to minimize the conflict suffered by each client. As a special case, attainment of this objective is realized by maximizing the number of clients that are conflict-free. However, the overall objective of a channel assignment scheme can also be to achieve improved levels of user-perceived throughput and network utilization. To achieve this overall objective, in still further embodiments, it is not only desirable that conflicts/interference be minimized, and but also desirable that load balancing (and other fairness issues) be addressed. More particularly, in such embodiments, it is undesirable if reducing overall interference is achieved by assigning channels in such a way that excessively high numbers of clients end up communicating with only a small number of the available APs.

In terms of achieving load balancing, it is evident that, apart from suffering interference from other APs and clients associated with other APs, a given client further shares the medium with other clients that are associated with the given client's own AP. The algorithm described above with respect to FIG. 3 and Table 1 makes clients associate to APs that are conflict-free, that is, free from inter-AP interference. However, if many clients are already associated to an AP, such clients would experience throughput reduction due to considerable intra-AP load. To achieve both load balancing and interference minimization, therefore, the channel assignment solution should associate clients to APs that minimize a combination of both intra-AP load and inter-AP interference.

An algorithm (and related process) for determining channel assignments that take into account the goal of load-balancing in addition to the goal of interference minimization can be developed as follows. Given a wireless network (X, C) and a client c in C, let the tuple $t_c = \langle r_c, i_c \rangle$ denote the range and interference sets for client c. Further, let $\Theta: X \to \{1 \ldots k\}$ be a channel/color assignment and let $\gamma: C \to X$ be an association mapping function (that is, the function specifying the AP with respect to which any client is associated). Additionally, let $\eta(x)$, where x is in X, denote the number of clients that are associated to an AP x.

Given the above assumptions (and notations), suppose that the client c is associated to the AP x in X. This client would suffer conflict from all APs and clients on the same channel as the client c. Further, given an AP y on the same channel as x, $\eta(y)+1$ stations (the AP y and all clients associated to AP y) share the medium with the client c. Therefore, the sum $\Sigma(\eta(y)+1)$, for all y in $(r_c \cup i_c)$ such that $\Theta(y)=\Theta(x)$, captures the total conflict (both intra-AP and inter-AP) that would be suffered by a client associating to AP x. This total conflict quantity, which can be denoted as $cf_c$, can thus be calculated by way of an equation (1) as follows:

$$cf_c = \sum_{\text{for all } y \text{ in}(r_c \cup i_c) | \Theta(y)=\Theta(\gamma(c))} (\eta(y) + 1) \quad (1)$$

The quantity $cf_c$ thus captures the total load suffered by c or, more closely, the number of stations that contend with c for the medium. The expected throughput over a unit timescale can be represented as $1/cf_c$ (ignoring short term unfairness inherent in 802.11 MAC).

Intuitively, the objective for the channel assignment scheme is to minimize the total conflict in the system, that is, to minimize $\Sigma\, cf_c$ for all c in C. However, this objective function can cause unfairness or imbalance in expected throughput between the clients. To counteract this, it is possible to further employ a min-max conflict optimization function as follows. First, let CF be a vector quantity referred to as a "conflict vector", where $CF=\{cf_1, \ldots cf_{|C|}\}$ and is representative of the total conflict experienced by each client, arranged in a non-increasing order of value. Assuming this to be the case, a channel assignment $\Theta$ and the corresponding association mapping $\gamma$ is said to be a min-max conflict assignment if its corresponding conflict vector $CF=\{cf_1, \ldots cf_n\}$ has the same or lower lexicographical value than any other channel assignment.

Further, given two n-tuples of numbers $C=\{cf_1, cf_2, \ldots, cf_n\}$ and $C'=\{cf'_1, cf'_2, \ldots, cf'_n\}$, each in non-increasing order, one can say that C lexicographically dominates C' if $C=C'$, or if there is some index j for which $cf_j > cf'_j$ and $cf_i = cf'_i$ for all $i \leq j$. Supposing that $C' \leq C$ denotes that C lexicographically dominates C', one can say that C and C' are equivalent if both $C \leq C'$ and $C' \leq C$. This relation thus defines a total order on the equivalence classes of conflict vectors or the corresponding channel assignments and association mappings. Also, the conflict vectors in the unique minimal equivalence class (under $\leq$) correspond to the fairest channel assignments and association mappings. We denote the lexicographical value of this conflict vector (arranged in non-increasing order of conflict value), the objective function $\tau$. The goal is to minimize the value of this objective function.

In view of the above discussion, it is possible to modify the algorithm described above with respect to FIG. 3 and Table 1 to incorporate load balancing, such that the measure of "performance" incorporates both the interference level and the degree to which load balancing (or fairness) has been achieved. More particularly, the same process as (or a similar process to) that shown in FIG. 3 and Table 1 can be performed to determine optimal performance except insofar as, while the algorithm of FIG. 3/Table 1 uses the number of conflict-free clients (e.g., Num_Conflict_Free) as the objective function, to incorporate load balancing the process is modified to utilize instead the objective function $\tau$ discussed above. In such case, those of the steps (e.g., the steps 56, 58, 70 and 72) of the process 40 that refer to determinations or storing of levels of interference can instead be understood to involve determinations of performance, where performance involves both interference levels and load balancing levels.

By using $\tau$ as the objective function (as constructed using the conflict function for calculating $cf_c$ as shown in eqn. 1, which captures the amount of conflict suffered by each client) it is possible to perform a 'fair' allocation of conflicts among clients (as measured by the conflict function). At the same, by using $\tau$ as the objective function, functional performance of the algorithm changes somewhat from when only interference is considered (e.g., when Num_Conflict_Free is the function that is used). More particularly, in applying the objective function $\tau$, a client decides to associate to an AP that offers minimum total conflict. This in turn affects the value of the objective function $\tau$. Therefore, because of this feedback, performance of the algorithm employing the objective function $\tau$ typically requires more rounds to converge to a solution in comparison with the algorithm of FIG. 3/Table 1 employing the Num_Conflict_Free function (also, any further changes to the coloring would only worsen the value of $\tau$).

Nevertheless, the presently-described algorithm employing the objective function $\tau$ converges provably even with the new objective function $\tau$ (in practice six rounds have been found to be sufficient). Further, in general, a lower value of $\tau$ tends to correspond to a fairer solution, and is thus bounded (by the fairest solution). It should further be noted that the presently-described algorithm, as modified to be cognizant of client load by way of the objective function $\tau$, jointly solves both the channel assignment and the load balancing problems by directly outputting the channel assignment for each AP. By using the load-aware objective function $\tau$ to address conflict set coloring, the algorithm implicitly decides the association between the clients and APs (each client is associated to the AP from its range set which has the minimum conflict). This association is a solution to the load balancing problem as well.

It is specifically intended that the present invention not be limited to the embodiments and illustrations contained herein, but include modified forms of those embodiments including portions of the embodiments and combinations of elements of different embodiments as come within the scope of the following claims.

We claim:

1. An access point (AP) comprising:
a transceiver by which the AP is capable of communicating with at least one client by way of a channel;
a port by which the AP is capable of being in communication with at least one additional AP of a WLAN of which the AP forms a part;
a memory device; and
a processing device coupled at least indirectly to each of the transceiver, the port, and the memory device,
wherein the AP receives by way of the transceiver at least one signal from the at least one client indicative of interference being experienced by the at least one client from at least one AP outside the range of the at least one client, and
wherein the processing device either by itself or in cooperation with at least one other processing device of one or more of the at least one additional AP, and based upon the at least one signal, determines the channel by which the transceiver is capable of communicating by:
(a) identifying both a respective range set and a respective interference set for each of a plurality of clients of the WLAN, wherein the range set for each given client describes the APs having the given client in range for communication, and the interference set for each client describes the APs that are not members of the range set but are (i) within a communication range of an AP communicating with the given client, or (ii) are within the communication range of another client that in turn is within either the range of the given client or the range of an AP communicating with the given client;
(b) assigning channels to APs to reduce interference from APs in the client's range set and interference set for the client's channel by selecting an assignment of channels to APs to increase the number of clients having, for each given client, one AP with a given channel in the range set of the given client where that given channel is not in the interference set of the given client.

2. The AP of claim 1, wherein the respective range sets and interference sets are determined from a conflict set system.

3. The AP of claim 2, wherein the conflict set system is determined from a plurality of site reports provided by the clients to the APs.

4. The AP of claim 1, wherein communication ranges are defined with respect to an iteratively refined interference level and wherein the iteration continues until a criterion has been met, the criterion being a measure of an attainment of a particular level of overall interference experienced among the APs and clients of the WLAN.

5. The AP of claim 4, wherein the criterion is a maximization of a number of the clients of the WLAN that would experience a substantially conflict-free state given present channel assignments.

6. The AP of claim 4, wherein the AP determines that the criterion has been attained when a recent interference level resulting from a recent channel assignment determined by a recent iteration is not a significant improvement over an earlier interference level resulting from an earlier channel assignment determined by an earlier iteration.

7. The AP of claim 4, wherein the criterion concerns both the interference levels experienced by at least some of the plurality of APs and load balancing of at least some of the plurality of APs.

8. The AP of claim 1, wherein the processing device is able to determine from the at least one signal both range set information and interference set information, and wherein the processing device either by itself or in cooperation with at least one other processing device determines the channel by performing an iterative algorithm that takes into account both the range set information and the interference set information.

9. A wireless local area network (WLAN) system comprising both the AP of claim 1 as well as the other AP and the at least one client.

10. A method of assigning channels to a plurality of access points (APs) of a wireless local area network (WLAN), comprising the steps of:
communicating by an AP through a transciever with at least one client by way of a channel;
communicating by the AP through a port with at least one additional AP of a WLAN of which the AP forms a part;
recieving by the AP through the transciever at least one signal from the at least one client indicative of interference being experienced by the at least one client from at least one AP outside the range of the at least one client, and
executing on a processing device on the AP either by itself or in cooperation with at least one other processing device of one or more of the at least one additional AP, and based upon the at least one signal, a stored program to determine the channel by which the transceiver is capable of communicating by the steps of:
(a) identifying both a respective range set and a respective interference set for each of a plurality of clients of the WLAN, wherein the range set for each given client describes the APs having the given client in range for communication, and the interference set for each client describes the APs that are not members of the range set but are (i) within a communication range of an AP communicating with the given client, or (ii) are within the communication range of another client that in turn is within either the range of the given client or the range of an AP communicating with the given client; and
(b) assigning channels to APs to reduce interference from APs in the client's range set and interference set for the client's channel by selecting an assignment of channels to APs to increase the number of clients having, for each given client, one AP with a given channel in the range set of the given client where that given channel is not in the interference set of the given client.

* * * * *